United States Patent
Matsunaga et al.

(10) Patent No.: US 9,450,243 B2
(45) Date of Patent: Sep. 20, 2016

(54) PRODUCTION PROCESS OF TRIMANGANESE TETRAOXIDE AND LITHIUM MANGANESE OXIDE

(71) Applicant: TOSOH CORPORATION, Yamaguchi (JP)

(72) Inventors: Takahiro Matsunaga, Yamaguchi (JP); Tadashi Kodama, Yamaguchi (JP); Naoto Suzuki, Yamaguchi (JP); Masao Sawano, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 14/386,480

(22) PCT Filed: Mar. 21, 2013

(86) PCT No.: PCT/JP2013/058138
§ 371 (c)(1),
(2) Date: Sep. 19, 2014

(87) PCT Pub. No.: WO2013/141317
PCT Pub. Date: Sep. 26, 2013

(65) Prior Publication Data
US 2015/0263345 A1    Sep. 17, 2015

(30) Foreign Application Priority Data

Mar. 22, 2012 (JP) .................................. 2012-065050
Jul. 6, 2012 (JP) .................................. 2012-152812

(51) Int. Cl.
*C01G 45/02* (2006.01)
*C01G 45/12* (2006.01)
(Continued)

(52) U.S. Cl.
CPC .............. *H01M 4/505* (2013.01); *C01G 45/02* (2013.01); *C01G 45/1242* (2013.01);
(Continued)

(58) Field of Classification Search
CPC ........................... C01G 45/12; C01G 45/1257
USPC .......................................... 423/50, 599, 605
See application file for complete search history.

(56) References Cited

U.S. PATENT DOCUMENTS

2012/0276446 A1* 11/2012 Kawai ................ C01G 45/1228
                                                                429/199
2013/0187083 A1*  7/2013 Iwata ..................... C01G 45/02
                                                                252/182.1

FOREIGN PATENT DOCUMENTS

CN          101898797          12/2010
JP          2-248326            4/1990
(Continued)

OTHER PUBLICATIONS

CN 101896796A—translation copy (publication date Dec. 2010).*
(Continued)

*Primary Examiner* — Holly Le
(74) *Attorney, Agent, or Firm* — Greenblum & Bernstein, P.L.C.

(57) ABSTRACT

To provide trimanganese tetraoxide having a high tap density and a uniform particle size distribution, and its production process. Trimanganese tetraoxide having a tap density of at least 1.5 g/cm$^3$ and a relative standard deviation of the particle size of at most 40%. A process for producing such trimanganese tetraoxide, which comprises a step of mixing a manganese aqueous solution and an alkaline aqueous solution so that the oxidation-reduction potential is at least 0 mV and OH$^-$/Mn$^{2+}$ (mol/mol) is at most 0.55.

8 Claims, 1 Drawing Sheet

(51) Int. Cl.
*H01M 4/505* (2010.01)
*H01M 10/0525* (2010.01)

(52) U.S. Cl.
CPC .... *C01G 45/1257* (2013.01); *H01M 10/0525* (2013.01); *C01P 2002/32* (2013.01); *C01P 2002/52* (2013.01); *C01P 2004/52* (2013.01); *C01P 2004/61* (2013.01); *C01P 2006/11* (2013.01); *C01P 2006/12* (2013.01); *C01P 2006/16* (2013.01); *C01P 2006/40* (2013.01); *C01P 2006/80* (2013.01); *Y02E 60/122* (2013.01); *Y02P 70/54* (2015.11); *Y10T 428/2982* (2015.01)

(56) References Cited

FOREIGN PATENT DOCUMENTS

| | | |
|---|---|---|
| JP | 2001-114521 | 4/2001 |
| JP | 2001-261343 | 9/2001 |
| JP | 2001-354425 | 12/2001 |
| JP | 2003-272629 | 9/2003 |
| JP | 2011-251862 | 12/2011 |
| JP | 2012-188341 | 10/2012 |
| WO | 2012/046735 | 4/2012 |
| WO | WO 2012/046735 A1 * | 4/2012 |

OTHER PUBLICATIONS

U.S. Appl. No. 14/395,191 to Eiichi Iwata et al., which was filed on Oct. 17, 2014.

Search report from International Patent Appl. No. PCT/JP2013/058138, mail date is Jun. 18, 2013.

International Preliminary Report on Patentability in PCT/JP2013/058138, issued Sep. 23, 2014 in English.

Extended European Search Report issued in Patent Application No. 13765135.2, dated Oct. 26, 2015.

* cited by examiner

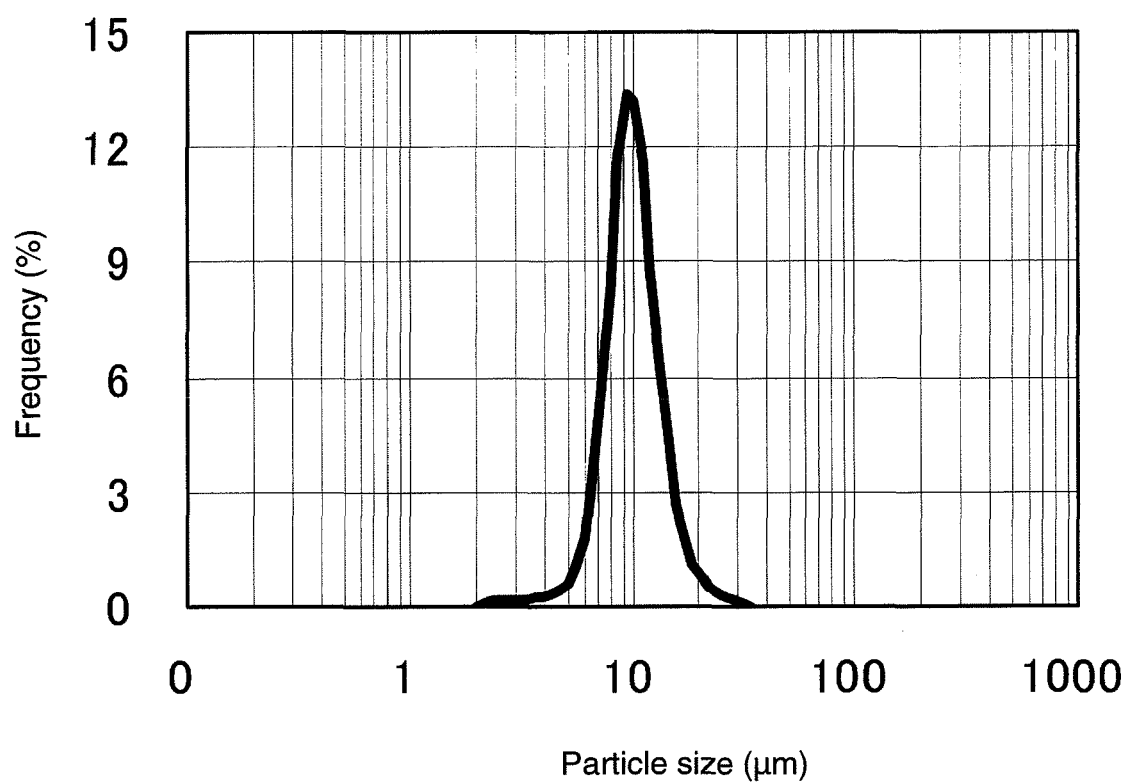

PRODUCTION PROCESS OF TRIMANGANESE TETRAOXIDE AND LITHIUM MANGANESE OXIDE

TECHNICAL FIELD

The present invention relates to trimanganese tetraoxide having a controlled particle size distribution and its production process.

BACKGROUND ART

Trimanganese tetraoxide attracts attention as a manganese material of a lithium manganese oxide due to its high fillability.

As a method for producing trimanganese tetraoxide, a method has been reported by which manganese hydroxide is formed from a manganese solution, which is oxidized to obtain trimanganese tetraoxide (for example, Patent Documents 1 and 2).

As another method for producing trimanganese tetraoxide, a method for producing trimanganese tetraoxide having a maximum particle size of at most 150 nm has been reported by which an alkali liquid is mixed with a manganese-containing liquid, followed by oxidation (for example, Patent Document 3).

PRIOR ART DOCUMENTS

Patent Documents

Patent Document 1: JP-A-2001-114521
Patent Document 2: JP-A-2003-272629
Patent Document 3: JP-A-2001-261343

DISCLOSURE OF THE INVENTION

Technical Problem

The trimanganese tetraoxide as disclosed in each of Patent Documents 1 and 2 has a relatively high tap density, however, its particle size is non-uniform and the distribution thereof is broad. Further, the trimanganese tetraoxide as disclosed in Patent Document 3 has a narrow particle size distribution, however, its density is low since its average particle size is so small as 100 nm, and it is not suitable as a manganese material of a lithium manganese oxide, etc.

Under these circumstances, the present invention is to solve such problems, and its object is to provide trimanganese tetraoxide having a high tap density and a uniform particle size distribution, and its production process.

Solution to Problem

The present inventors have conducted extensive studies on a process for producing a manganese oxide used as a material of a lithium manganese oxide. As a result, they have found trimanganese tetraoxide having a uniform particle size distribution in addition to a high tap density. Further, they have found that such trimanganese tetraoxide can be obtained by a process for producing trimanganese tetraoxide by a chemical method, wherein the ratio of the material solution is controlled when the trimanganese tetraoxide is obtained.

That is, the present invention provides the following.

(1) Trimanganese tetraoxide having a tap density of at least 1.5 g/cm$^3$ and a relative standard deviation of the particle size of at most 40%.

(2) The trimanganese tetraoxide according to the above (1), which has an average particle size of at least 1 μm.

(3) The trimanganese tetraoxide according to the above (1) or (2), which has an average particle size of at most 20 μm.

(4) The trimanganese tetraoxide according to any one of the above (1) to (3), which has a relative standard deviation of the particle size of at most 35%.

(5) A process for producing the trimanganese tetraoxide as defined in any one of the above (1) to (4), which comprises a step of mixing a manganese aqueous solution and an alkaline aqueous solution so that the oxidation-reduction potential is at least 0 mV and OH$^-$/Mn$^{2+}$ (mol/mol) is at most 0.55.

(6) The process for producing the trimanganese tetraoxide according to the above (5), wherein OH$^-$/Mn$^{2+}$ (mol/mol) is at least 0.35.

(7) The process for producing the trimanganese tetraoxide according to the above (5) or (6), wherein the oxidation-reduction potential is at least 40 mV.

(8) The process for producing the trimanganese tetraoxide according to any one of the above (5) to (7), wherein the trimanganese tetraoxide is directly precipitated from the manganese aqueous solution.

(9) A method for producing a lithium manganese oxide, wherein the trimanganese tetraoxide as defined in any one of the above (1) to (4) is used.

(10) A lithium manganese oxide, which is obtained from the trimanganese tetraoxide as defined in any one of the above (1) to (4) as the material.

(11) A lithium ion secondary battery, which comprises the lithium manganese oxide as defined in the above (10).

Advantageous Effects of Invention

According to the present invention, trimanganese tetraoxide having a high tap density and a uniform particle size distribution can be provided.

The trimanganese tetraoxide of the present invention may be used as a material of a lithium manganese oxide excellent in the cycle life particularly at high temperature.

Further, the lithium manganese oxide may be suitably used as a cathode active material of a lithium secondary battery.

Further, according to the present invention, it is possible to provide a process for producing trimanganese tetraoxide which does not require particle size adjustment after production such as classification, granulation or grinding.

BRIEF DESCRIPTION OF DRAWINGS

FIG. 1 illustrates a particle size distribution of trimanganese tetraoxide in Example 1.

DESCRIPTION OF EMBODIMENTS

Now, the trimanganese tetraoxide of the present invention will be described.

The tap density of the trimanganese tetraoxide of the present invention is at least 1.5 g/cm$^3$, preferably at least 1.6 g/cm$^3$, more preferably at least 1.8 g/cm$^3$, further preferably at least 1.9 g/cm$^3$, still further preferably at least 2.0 g/cm$^3$. If the tap density is less than 1.5 g/cm$^3$, the fillability of the trimanganese tetraoxide tends to be low. Accordingly, the fillability of a lithium manganese oxide obtained from such trimanganese tetraoxide tends to be low.

The higher the tap density of the trimanganese tetraoxide is, the higher the fillability tends to be. However, the tap density of the trimanganese tetraoxide of the present invention is preferably at most 2.6 g/cm$^3$, more preferably at most 2.5 g/cm$^3$, further preferably at most 2.4 g/cm$^3$. Within such a range, a high packing density will be obtained while a high reactivity with lithium is maintained.

"The tap density" in the present invention is an apparent density of a powder obtained by tapping a container under specific conditions. Accordingly, it is different from a so-called press density i.e. a density of a powder in a state where the powder is packed in a container and pressure-molded under a certain pressure. The tap density may be measured, for example, by a method disclosed in the aftermentioned Examples.

In order to obtain a more uniform reactivity with a lithium compound, the trimanganese tetraoxide of the present invention has a relative standard deviation of the particle size of at most 40%. By the relative standard deviation of the particle size being at most 40%, trimanganese tetraoxide having a narrow particle size distribution and a uniform particle size is obtained. The smaller the relative standard deviation of the particle size is, the more uniform the particle size distribution tends to be, and the more uniform the reaction of the trimanganese tetraoxide and a lithium compound tends to be. Accordingly, the relative standard deviation of the particle size is preferably at most 35%, more preferably at most 30%, further preferably at most 25%, still further preferably at most 20%, whereby a lithium manganese oxide excellent in the battery characteristics particularly the cycle characteristics at high temperature will readily be obtainable.

The standard deviation of the particle size may be obtained by measuring the particle size distribution of trimanganese tetraoxide, and the relative standard deviation of the particle size may be obtained from the following formula.

Relative standard deviation(%)=(standard deviation of particle size/average particle size)×100

Since the relative standard deviation of the particle size of the trimanganese tetraoxide of the present invention is small, the particle size distribution tends to have one peak, that is, it tends to be a so-called monomodal particle size distribution.

In order to obtain excellent battery performance particularly good cyclability and rate capability of a lithium manganese oxide obtained by using the trimanganese tetraoxide of the present invention as a material, the average particle size of the trimanganese tetraoxide of the present invention is preferably at least 1 µm, more preferably at least 3 µm, further preferably at most 5 µm, still further preferably at least 8 µm, particularly preferably at least 10 µm. On the other hand, in view of the handleability, the average particle size should be at most 50 µm, further at most 20 µm.

The trimanganese tetraoxide of the present invention more preferably has an average particle size within the above range in addition to the relative standard deviation of the particle size within the above range. By the trimanganese tetraoxide of the present invention having both relative standard deviation of the particle size and average particle size of the present invention, it is excellent in not only the reactivity with a lithium compound but also the handleability, and is a powder more suitable as a manganese raw material of a lithium manganese oxide.

The trimanganese tetraoxide of the present invention has a pore volume ratio of pores having a diameter of at least 10 µm as measured by a mercury intrusion technique (hereinafter referred to simply as "a pore volume ratio of pores having a diameter of at least 10 µm") of preferably at most 20%. By the pore volume ratio of pores having a diameter of at least 10 µm being at most 20%, the reaction with a lithium compound tends to be uniform.

"The pore volume ratio" in the present invention is a ratio of the total volume of pores (for example, pores having a pore diameter of at least 10 µm) having a diameter within a predetermined range to the total volume of all the pores of the trimanganese tetraoxide. The diameter distribution and the pore volume of pores may be measured by a commercially available porosimeter employing a mercury intrusion technique.

The trimanganese tetraoxide of the present invention has a pore area ratio of pores having a diameter of at most 0.1 µm as measured by the mercury intrusion technique (hereinafter referred to simply as "a pore area ratio of pores having a diameter of at least 0.1 µm") of preferably at most 15%. By the amount of fine pores having a diameter of at most 0.1 µm being small, the reaction of the trimanganese tetraoxide and a lithium compound tends to be more uniform.

The trimanganese tetraoxide of the present invention has a pore area ratio of pores having a diameter of at most 0.05 µm as measured by a mercury intrusion technique of preferably at most 5%. In the same manner as the pores having a diameter of at least 0.1 µm, by the amount of fine pores having a diameter of at most 0.05 µm being small, the reaction of the trimanganese tetraoxide and a lithium compound tends to be more uniform.

"The pore area ratio" in the present invention is a ratio of the total area of pores (for example, pores having a pore diameter of at most 0.1 µm) having a diameter within a predetermined range to the total area of all the pores of the trimanganese tetraoxide. The diameter distribution and the pore area of pores may be measured by a commercially available porosimeter employing a mercury intrusion technique.

The BET specific surface area of the trimanganese tetraoxide of the present invention is preferably at most 5 m$^2$/g. By the BET specific surface area being at most 5 m$^2$/g, the reaction of the trimanganese tetraoxide and a lithium compound tends to be more uniform.

One of the reasons why the trimanganese tetraoxide of the present invention has excellent performance as a raw material of a lithium manganese oxide is that the trimanganese tetraoxide of the present invention has not only a high fillability but also a uniform particle size distribution, whereby the uniformity of the reactivity with a lithium compound is improved.

The crystal structure of trimanganese tetraoxide is a spinel structure. This crystal structure shows the same X-ray diffraction pattern as No. 24-734 X-ray diffraction pattern of the JCPDS pattern.

The chemical formula of trimanganese tetraoxide is represented as $Mn_3O_4$. Accordingly, in a case where trimanganese tetraoxide is represented by $MnO_x$, the ratio x of the oxygen element to the manganese element is from 1.33 to 1.34. However, the ratio x of oxygen to manganese of the trimanganese tetraoxide of the present invention is not limited to 1.33 to 1.34. The trimanganese tetraoxide of the present invention has the above crystal structure, and may be a manganese oxide represented by MnO$_x$ wherein x is within a range of from 1.20 to 1.4.0. x is preferably from 1.25 to 1.40, more preferably from 1.30 to 1.40.

Now, the process for producing the trimanganese tetraoxide of the present invention will be described.

The trimanganese tetraoxide of the present invention may be produced by a process for producing trimanganese tetraoxide, which comprises a step of mixing a manganese aqueous solution with an alkaline aqueous solution so that the oxidation-reduction potential is at least 0 mV and OH$^-$/Mn$^{2+}$ (mol/mol) (hereinafter referred to as "a manganese molar ratio") is at most 0.55.

The production process of the present invention comprises a step of mixing a manganese aqueous solution with an alkaline aqueous solution so that the above oxidation-reduction potential and manganese molar ratio are achieved, whereby precipitation of trimanganese tetraoxide from the manganese aqueous solution can be carried out. That is, in the production process of the present invention, trimanganese tetraoxide can be precipitated without a step of forming crystals of manganese hydroxide from the manganese aqueous solution.

In a conventional production process, manganese hydroxide is formed from a manganese aqueous solution first, and then the manganese hydroxide is oxidized in an oxidizing atmosphere such as in oxygen or in the air, to form trimanganese tetraoxide. In such a production process, it is necessary to change the reaction atmosphere in the middle of the step to obtain trimanganese tetraoxide. Thus, by such a production process by means of manganese hydroxide, trimanganese tetraoxide cannot be continuously produced.

Whereas, by the production process of the present invention, trimanganese tetraoxide is directly precipitated from the manganese aqueous solution by producing trimanganese tetraoxide with the above oxidation-reduction potential and manganese molar ratio. Accordingly, in the production process of the present invention, it is not necessary to change the reaction atmosphere in the middle of the step. Thus, trimanganese tetraoxide can be continuously produced by mixing a manganese aqueous solution with an alkaline aqueous solution.

Here, "the trimanganese tetraoxide is directly precipitated from the manganese aqueous solution" means that hexagonal plate-form crystals of manganese hydroxide do not form from the manganese aqueous solution, and such including an embodiment such that a crystal phase of manganese hydroxide does not form at all and an embodiment such that fine crystals of manganese hydroxide are precipitated in a short time and then they are converted to trimanganese tetraoxide before they grow into hexagonal plate-form crystals.

Further, whether the hexagonal plate-form crystals of manganese hydroxide are formed or not can be judged by observing the particle shape of the obtained trimanganese tetraoxide.

The manganese aqueous solution used in the production process of the present invention may be an aqueous solution containing manganese ions, and may, for example, be an aqueous solution of manganese sulfate, manganese chloride, manganese nitrate or manganese acetate, or a solution having metal manganese, manganese oxide or the like dissolved in an acid aqueous solution of e.g. sulfuric acid, hydrochloric acid, nitric acid or acetic acid.

The manganese ion concentration of the manganese aqueous solution may be an optional concentration, and for example, the manganese ion concentration is preferably at least 1 mol/L. By the manganese ion concentration of the manganese aqueous solution being at least 1 mol/L, the trimanganese tetraoxide will efficiently be obtained.

The temperature of the manganese aqueous solution is preferably at least 40° C., more preferably at least 60° C. and at most 95° C., further preferably at least 70° C. and at most 80° C. By the temperature of the manganese aqueous solution at the time of precipitation being within such a range, precipitation of the trimanganese tetraoxide tends to be accelerated, and the particle size of the trimanganese tetraoxide tends to be uniform.

The alkaline aqueous solution used in the production process of the present invention may be an aqueous solution showing alkalinity, and may, for example, be an aqueous solution of e.g. sodium hydroxide or potassium hydroxide.

The concentration of the alkaline aqueous solution is not limited. In order to obtain high reaction efficiency, the concentration of hydroxide ions (OH$^-$) of the alkaline aqueous solution is preferably at least 1 mol/L.

The step of mixing the manganese aqueous solution with the alkaline aqueous solution is carried out at an oxidation-reduction potential of at least 0 mV. If the oxidation-reduction potential is less than 0 mV, a manganese oxide other than the trimanganese tetraoxide is included, and a manganese oxide having a low fillability is formed. In order that the trimanganese tetraoxide is readily precipitated directly from manganese ions, the oxidation-reduction potential is preferably at least 40 mV, more preferably at least 60 mV, further preferably at least 80 mV.

By the oxidation-reduction potential being high, a trimanganese tetraoxide single phase is readily obtained, and when it is at most 300 mV, further at most 200 mV, single phase trimanganese tetraoxide is more readily obtained. The oxidation-reduction potential may be obtained as a value to the standard hydrogen electrode (SHE).

In the step of mixing the manganese aqueous solution with the alkaline aqueous solution, the manganese molar ratio is at most 0.55. If the manganese molar ratio exceeds 0.55, not only the tap density of the obtained manganese oxide is low, but also the relative standard deviation of the particle size tends to be large, and further, a single phase of trimanganese tetraoxide is hardly obtained. The manganese molar ratio is preferably at most 0.52, more preferably at most 0.5.

Further, the manganese molar ratio is at least 0.35, preferably at least 0.4, more preferably at least 0.45, whereby trimanganese tetraoxide will efficiently be produced.

In the process for producing trimanganese tetraoxide of the present invention, it is preferred to precipitate the trimanganese tetraoxide using an oxidizing agent. The oxidizing agent is not particularly limited and may, for example, be an oxygen-containing gas (including the air) or hydrogen peroxide. It is preferred to use as the oxidizing agent an oxygen-containing gas, more preferably the air, which can be used easily.

In the production process of the present invention, when the manganese aqueous solution and the alkaline aqueous solution are mixed with the above oxidation-reduction potential and manganese molar ratio satisfied, the obtained trimanganese tetraoxide has a high tap density and a uniform particle size distribution. Accordingly, so long as the above oxidation-reduction potential and manganese molar ratio are satisfied, the method of mixing the manganese aqueous solution with the alkaline aqueous solution is optional.

The mixing method may, for example, be a method of directly mixing the manganese aqueous solution with the alkaline aqueous solution so that the oxidation-reduction potential and the manganese molar ratio are within the ranges of the present invention, or a method of adding the manganese aqueous solution and the alkaline aqueous solution to a solvent such as water or a slurry so that the oxidation-reduction potential and the manganese molar ratio are within the ranges of the present invention, followed by mixing.

With a view to sufficiently and uniformly reacting the manganese aqueous solution with the alkaline aqueous solution, the mixing method is preferably a method of adding the manganese aqueous solution and the alkaline aqueous solution to a solvent, followed by mixing. In such a case, the manganese aqueous solution and the alkaline aqueous solution are mixed so that the oxidation-reduction potential and the manganese molar ratio in the solvent are within the ranges of the present invention. A more preferred mixing method may, for example, be a method of adding the manganese aqueous solution and the alkaline aqueous solution to the solvent respectively at constant rates to the solvent, or a method of adding the manganese aqueous solution and the alkaline aqueous solution to the solvent at the addition rates so that the manganese molar ratio of the manganese aqueous solution and the alkaline aqueous solution is within a range of the manganese molar ratio of the present invention, followed by mixing. A more preferred mixing method may, for example, be a method in which a solvent which contains no manganese ions such as water is used, and the manganese aqueous solution and the alkaline aqueous solution are added to the solvent at addition rates so that the manganese molar ratio of the manganese aqueous solution and the alkaline aqueous solution is within a range of the manganese molar ratio of the present invention, followed by mixing. By adding and mixing the manganese aqueous solution and the alkaline aqueous solution in such a manner, continuous production of the trimanganese tetraoxide is more readily carried out.

In the process for producing the trimanganese tetraoxide of the present invention, it is preferred not to use a complexing agent when the manganese aqueous solution and the alkaline aqueous solution are mixed. The complexing agent in the present invention means ammonia, an ammonium salt, hydrazine or EDTA, or one having the same complexing ability as those.

Such a complexing agent influences the trimanganese tetraoxide precipitation behavior. Accordingly, the trimanganese tetraoxide obtained in the presence of a complexing agent tends to be one differing in the fillability, the particle size distribution, etc. from the trimanganese tetraoxide of the present invention.

In the production process of the present invention, after the crystallization step, a filtration and washing step, a drying step or both may be carried out.

In the filtration and washing step, the trimanganese tetraoxide is recovered from the reaction slurry. As the washing method, the crystallized trimanganese tetraoxide is filtrated and subjected to solid-liquid separation, and the obtained crystals are washed with e.g. pure water.

In the drying step, moisture in the trimanganese tetraoxide after crystallization or after filtration and washing is removed. As the drying method, the trimanganese tetraoxide may be left in the air at a temperature of from about 100° C. to 120° C. for from about 5 to 24 hours.

According to the production process of the present invention, not only trimanganese tetraoxide having a high fillability can be produced, but also trimanganese tetraoxide having a uniform particle size distribution can be produced without any additional granulation treatment such as classification or grinding. Accordingly, in the production process of the present invention, a granulation step to adjust the particle size of the trimanganese tetraoxide, such as grinding or classification, may not be carried out.

The trimanganese tetraoxide of the present invention may be used as a manganese material of a lithium manganese oxide. Now, a process for producing a lithium manganese oxide using the trimanganese tetraoxide of the present invention as a manganese material will be described.

The process for producing a lithium manganese oxide of the present invention comprises a mixing step of mixing the above trimanganese tetraoxide with at least one of lithium and a lithium compound, and a heating step of subjecting the mixture to heat treatment.

In the mixing step, when the trimanganese tetraoxide is mixed with a lithium compound, another metal compound may be added so as to improve the characteristics of a lithium secondary battery cathode material of the lithium manganese oxide. Such another metal compound has a metal element different from manganese and lithium as the constituting element. For example, it is a compound containing as a constituting element at least one member selected from the group consisting of Al, Mg, Ni, Co, Cr, Ti and Zr. The same effects will be obtained even when such another metal compound is added.

The lithium manganese oxide preferably has a spinel crystal structure. The lithium manganese oxide is represented by the following chemical formula (1):

$$Li_{1+x}M_yMn_{2-x-y}O_4 \qquad (1)$$

In the above formula (1), M is at least one metal element selected from the group consisting of elements other than Li, Mn and O, and x and y respectively satisfy the following formulae (2) and (3):

$$0 \leq x \leq 0.33 \qquad (2)$$

$$0 \leq y \leq 1.0 \qquad (3)$$

The lithium compound may be any compound. The lithium compound may, for example, be lithium hydroxide, lithium oxide, lithium carbonate, lithium iodide, lithium nitrate, lithium oxalate or an alkyl lithium. A preferred lithium compound may, for example, be lithium hydroxide, lithium oxide or lithium carbonate.

The lithium manganese oxide obtained by using the trimanganese tetraoxide of the present invention as a material may be used as a cathode active material of a lithium ion secondary battery.

EXAMPLES

Now, the present invention will be described in with reference to Examples. However, the present invention is by no means restricted to such specific Examples. Evaluations in Examples and Comparative Examples are carried out as follows.

(Tap Density)

The density after 5 g of a sample was filled in a 10 mL measuring cylinder and tapped 200 times was taken as the tap density.

(Average Particle Size and Standard Deviation of Particle Size)

As the average particle size of a sample, the particle size of existing particle with a highest volume fraction (hereinafter referred to as "modal particle size") was measured. To measure the modal particle size, a commercially available particle size measuring apparatus (tradename: MICROTRAC HRA 9320-X100, manufactured by Nikkiso Co., Ltd.) was used. Further, before measurement, the sample was dispersed in pure water to obtain a measurement solution, and ammonia water was added thereto to adjust the pH to be 8.5. Then, the measurement solution was subjected to ultrasonic dispersion for 3 minutes, and then the modal particle size and the standard deviation of the particle size were measured.

The relative standard deviation of the particle size was determined from the measured modal particle size and standard deviation of the particle size in accordance with the following formula:

Relative standard deviation(%)=(standard deviation of particle size/average particle size)×100

(X-Ray Diffraction Measurement)

The crystal phase of a sample was measured by X-ray diffraction. For measurement, a conventional X-ray diffraction apparatus was used. Measurement was carried out using CuKα radiation (λ=1.5405 Å) as the light source with a step scanning as the measurement mode under scanning conditions of 0.04° every second for a measuring time of 3 seconds within a measurement range 2θ of from 5° to 80°.

Example 1

Pure water at 80° C. was stirred while the air was brown thereinto. A 2 mol/L manganese sulfate aqueous solution and a 2 mol/L sodium hydroxide aqueous solution were respectively added to the pure water so that the oxidation-reduction potential of the pure water was constant at 100 mV, whereby a manganese oxide was precipitated to obtain a slurry (hereinafter referred to as "mixed reaction slurry").

The manganese sulfate aqueous solution and the sodium hydroxide aqueous solution were continuously added to the pure water (mixed reaction slurry) while the rates of addition of the manganese sulfate aqueous solution and the sodium hydroxide aqueous solution were adjusted so that the manganese molar ratio of the manganese sulfate aqueous solution and the sodium hydroxide aqueous solution added would be 0.49.

The obtained mixed reaction slurry was subjected to filtration, washed and dried to obtain a manganese oxide.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 1 are shown in Table 1.

Further, of the obtained trimanganese tetraoxide, the density by the measurement method in accordance with JIS R1628 (hereinafter referred to as "JIS density") was measured. As a result, the JIS density of the manganese oxide in Example 1 was 2.2 g/cm$^3$, which was 1.1 times the tap density.

Example 2

A manganese oxide was obtained in the same manner as in Example 1 except that the manganese molar ratio of the manganese sulfate aqueous solution and the sodium hydroxide aqueous solution was 0.45.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 2 are shown in Table 1.

Example 3

A manganese oxide was obtained in the same manner as in Example 1 except that the manganese molar ratio of the manganese sulfate aqueous solution and the sodium hydroxide aqueous solution was 0.485 and that the oxidation-reduction potential of the pure water was constant at 80 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 3 are shown in Table 1.

Example 4

A manganese oxide was obtained in the same manner as in Example 1 except that the manganese molar ratio of the manganese sulfate aqueous solution and the sodium hydroxide aqueous solution was 0.495 and that the oxidation-reduction potential of the pure water was constant at 180 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.33. From these results, the obtained manganese oxide was confirmed to be a trimanganese tetraoxide single phase.

The conditions for production of the trimanganese tetraoxide and the results of evaluation of the trimanganese tetraoxide in Example 4 are shown in Table 1.

Example 5

A manganese oxide was obtained in the same manner as in Example 1 except that the manganese molar ratio of the manganese sulfate aqueous solution and the sodium hydroxide aqueous solution was 0.505 and that the oxidation-reduction potential of the pure water was constant at 60 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

Further, the JIS density of the manganese oxide in Example 5 was 2.6 g/cm$^3$, which was 1.1 times the tap density.

Further, the composition of the obtained trimanganese tetraoxide was measured by ICP emission spectroscopic analysis. As a result, the trimanganese tetraoxide in Example 5 had a composition mainly comprising 70.3 wt % of Mn, 120 wt ppm of Na and 120 wt ppm of Ca.

The conditions for production of the trimanganese tetraoxide and the results of evaluation of the trimanganese tetraoxide in Example 5 are shown in Table 1.

Example 6

A manganese oxide was obtained in the same manner as in Example 1 except that the manganese molar ratio of the manganese sulfate aqueous solution and the sodium hydroxide aqueous solution was 0.48 and that the oxidation-reduction potential of the pure water was constant at 40 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.33. From these results, the obtained manganese oxide was confirmed to be a trimanganese tetraoxide single phase.

The conditions for production of the trimanganese tetraoxide and the results of evaluation of the trimanganese tetraoxide in Example 6 are shown in Table 1.

Example 7

A manganese oxide was obtained in the same manner as in Example 1 except that the manganese molar ratio of the manganese sulfate aqueous solution and the sodium hydroxide aqueous solution was 0.48 and that the oxidation-reduction potential of the pure water was constant at 200 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 7 are shown in Table 1.

Example 8

A manganese oxide was obtained in the same manner as in Example 1 except that the manganese molar ratio of the manganese sulfate aqueous solution and the sodium hydroxide aqueous solution was 0.4.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 8 are shown in Table 1.

Example 9

A manganese oxide was obtained in the same manner as in Example 1 except that pure water at 60° C. was stirred while the air was brown thereinto, that the manganese molar ratio of the manganese sulfate aqueous solution and the sodium hydroxide aqueous solution was 0.455, and that the oxidation-reduction potential of the pure water was constant at 150 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 9 are shown in Table 1.

Example 10

A manganese oxide was obtained in the same manner as in Example 1 except that pure water at 60° C. was stirred while the air was brown thereinto, that the manganese molar ratio of the manganese sulfate aqueous solution and the sodium hydroxide aqueous solution was 0.485, and that the oxidation-reduction potential of the pure water was constant at 180 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 10 are shown in Table 1.

Example 11

A manganese oxide was obtained in the same manner as in Example 1 except that the manganese molar ratio of the manganese sulfate aqueous solution and the sodium hydroxide aqueous solution was 0.48 and that the oxidation-reduction potential of the pure water was constant at 90 mV.

The X-ray diffraction pattern of the obtained manganese oxide was the same pattern as No. 24734 X-ray diffraction pattern of the JCPDS pattern, and its crystal phase was a spinel structure. Further, the degree of oxidation of manganese of the manganese oxide as represented as MnOx was x=1.34. From these results, the obtained manganese oxide was confirmed to be a trimanganese tetraoxide single phase.

The conditions for production of the trimanganese tetraoxide and the results of evaluation of the trimanganese tetraoxide in Example 11 are shown in Table 1.

Comparative Example 1

A manganese oxide was obtained in the same manner as in Example 1 except that the manganese molar ratio of the manganese sulfate aqueous solution and the sodium hydroxide aqueous solution was 0.575 and that the oxidation-reduction potential of the pure water was constant at −100 mV.

The X-ray diffraction pattern of the obtained manganese oxide was that of a mixture of manganese hydroxide and trimanganese tetraoxide.

The manganese oxide produced under conditions such that the manganese molar ratio of the manganese sulfate aqueous solution and the sodium hydroxide aqueous solution was high was not a trimanganese tetraoxide single phase and had a low tap density.

Further, the JIS density of the manganese oxide in Comparative Example 1 was 1.4 g/cm$^3$, which was 1.1 times the tap density.

The conditions for production of the manganese oxide and the results of evaluation of the manganese oxide in Comparative Example 1 are shown in Table 1.

Comparative Example 2

A manganese oxide was obtained in the same manner as in Example 1 except that the manganese molar ratio of the manganese sulfate aqueous solution and the sodium hydroxide aqueous solution was 0.485 and that the oxidation-reduction potential of the pure water was constant at −10 mV.

The X-ray diffraction pattern of the obtained manganese oxide was that of a mixture of manganese hydroxide and trimanganese tetraoxide.

The conditions for production of the manganese oxide and the results of evaluation of the manganese oxide in Comparative Example 2 are shown in Table 1.

Further, the composition of the obtained manganese oxide was measured by ICP emission spectroscopic analysis. As a result, the manganese oxide in Comparative Example 2 had a composition mainly comprising 70.2 wt % of Mn, 350 wt ppm of Na and 200 wt ppm of Ca.

size distribution, without a granulation step after production of the trimanganese tetraoxide, such as classification or grinding.

[Measurement Results]
(Synthesis of Lithium Manganate and Preparation of Lithium Secondary Battery)

Using the trimanganese tetraoxide in each of Examples 1, 9, 10 and 11, lithium manganate was produced.

The trimanganese tetraoxide and manganese carbonate were mixed in a mortar and fired in a stream of the air at 850° C. for 12 hours, whereby a lithium manganese oxide containing Li and Mn as constituting elements was obtained. The obtained lithium manganese oxide was lithium manganate having a spinel structure single phase and having a composition of $Li_{1.1}Mn_{1.9}O_4$.

Then, a lithium secondary battery was prepared using the obtained lithium manganate as a cathode active material.

25 mg of the lithium manganate was weighed, which was mixed with a mixture of polytetrafluoroethylene with acetylene black (tradename: TAB-2) in a weight ratio of lithium manganate:TAB-2=2:1 to obtain a mixed powder. The obtained mixed powder was formed into pellets under a pressure of 1 ton/cm$^2$. The pellets were contact bonded on a mesh (made of SUS316) having a diameter of 16 mm and vacuum dried at 150° C. to obtain a cathode for a battery.

A CR2032 coin cell battery was prepared using the obtained cathode for a battery as the cathode, a metal lithium foil (thickness: 0.2 mm) as the anode and a solution com-

TABLE 1

| | Manganese molar ratio ($OH^-/Mn^{2+}$; mol/mol) | Evaluation results | | | | | |
|---|---|---|---|---|---|---|---|
| | | Oxidation-reduction potential | Average particle size (μm) | Standard deviation σ of particle size (μm) | Relative standard deviation of particle size (%) | Tap density (g/cm$^3$) | Crystal phase |
| Ex. 1 | 0.490 | 100 | 10 | 2.0 | 20 | 2.0 | Trimanganese tetraoxide |
| Ex. 2 | 0.450 | 100 | 9 | 1.9 | 21 | 1.9 | Trimanganese tetraoxide |
| Ex. 3 | 0.485 | 80 | 15 | 5.3 | 35 | 1.7 | Trimanganese tetraoxide |
| Ex. 4 | 0.495 | 180 | 18 | 5.4 | 30 | 2.0 | Trimanganese tetraoxide |
| Ex. 5 | 0.505 | 60 | 20 | 6.8 | 34 | 2.4 | Trimanganese tetraoxide |
| Ex. 6 | 0.480 | 40 | 9 | 2.6 | 29 | 1.8 | Trimanganese tetraoxide |
| Ex. 7 | 0.480 | 200 | 10 | 3.0 | 30 | 1.6 | Trimanganese tetraoxide |
| Ex. 8 | 0.400 | 60 | 8 | 1.0 | 12 | 1.7 | Trimanganese tetraoxide |
| Ex. 9 | 0.455 | 150 | 3 | 1.0 | 33 | 1.8 | Trimanganese tetraoxide |
| Ex. 10 | 0.485 | 180 | 5 | 1.6 | 32 | 1.8 | Trimanganese tetraoxide |
| Ex. 11 | 0.480 | 90 | 6 | 1.8 | 30 | 1.8 | Trimanganese tetraoxide |
| Comp. Ex. 1 | 0.575 | −100 | 20 | 9.2 | 46 | 1.3 | Manganese hydroxide Trimanganese tetraoxide |
| Comp. Ex. 2 | 0.485 | −10 | 19 | 14.5 | 76 | 1.2 | Manganese hydroxide Trimanganese tetraoxide |

As evident from such Examples, according to the present invention, it is possible to provide trimanganese tetraoxide not only having a high fillability but also having a relative standard deviation of the particle size of at most 40% and a narrow particle size distribution. Particularly according to the present invention, it is possible to provide trimanganese tetraoxide having a high fillability and a narrow particle size distribution, which has a tap density of at least 1.7 g/cm$^3$ and a relative standard deviation of the particle size of at most 35%, regardless of whether it is trimanganese tetraoxide having a small particle size with an average particle size of at least 3 μm or trimanganese tetraoxide having a large particle size with an average particle size of at least 15 μm.

Further, according to the present invention, it is possible to provide trimanganese tetraoxide having a uniform particle size, i.e. trimanganese tetraoxide having a narrow particle prising lithium hexafluorophosphate dissolved at a concentration of 1 mol/dm$^3$ in a mixed solvent of ethylene carbonate with dimethyl carbonate (volume ratio of 1:2) as the electrolyte.

Using the battery, evaluation by constant current charge and discharge was carried out at a charge and discharge current density of 0.4 mA/cm$^2$ (0.3 hour discharge ratio: corresponding to 0.3 C) at a charge and discharge voltage of from 4.3V to 3.0V at a temperature of 60° C. The charge and discharge were carried out 50 times, and the ratio of the 50th discharge capacity to the first discharge capacity (105 mAh/g) was obtained and taken as the discharge capacity retention ratio. The evaluation results are shown in Table 2.

TABLE 2

| | Lithium manganate | | Lithium secondary battery Discharge capacity retention ratio |
|---|---|---|---|
| | Crystal phase | Composition | (%, $50^{th}/1^{st}$) |
| Ex. 1 | LiMn spinel single phase | $Li_{1.1}Mn_{1.9}O_4$ | 96.4 |
| Ex. 9 | LiMn spinel single phase | $Li_{1.1}Mn_{1.9}O_4$ | 96.8 |
| Ex. 10 | LiMn spinel single phase | $Li_{1.1}Mn_{1.9}O_4$ | 96.4 |
| Ex. 11 | LiMn spinel single phase | $Li_{1.1}Mn_{1.9}O_4$ | 97.7 |

As evident from Table 2, the battery using as a cathode active material lithium manganate obtained from the trimanganese tetraoxide of the present invention as a material was found to be a battery excellent in the cycle characteristics with a high discharge capacity retention ratio of at least 95% or further at least 96% even in a high temperature environment of 60° C.

INDUSTRIAL APPLICABILITY

The trimanganese tetraoxide of the present invention is suitably used as a material of a lithium manganese oxide.

The entire disclosures of Japanese Patent Application No. 2012-065050 filed on Mar. 22, 2012 and Japanese Patent Application No. 2012-152812 filed on Jul. 6, 2012 including specifications, claims, drawings and summaries are incorporated herein by reference in their entireties.

The invention claimed is:

1. A process for producing the trimanganese tetraoxide which comprises mixing a manganese aqueous solution and an alkaline aqueous solution of sodium hydroxide or potassium hydroxide so that the oxidation-reduction potential is at least 0 mV and $OH^-/Mn^{2+}$ (mol/mol) is at most 0.55, wherein a complexing agent is not used when the manganese aqueous solution and the alkaline aqueous solution are mixed, and wherein the trimanganese tetraoxide has a tap density of at least 1.5 g/cm$^3$ and a relative standard deviation of the particle size of at most 40%.

2. The process for producing the trimanganese tetraoxide according to claim 1, wherein $OH^-/Mn^{2+}$ (mol/mol) is at least 0.35.

3. The process for producing the trimanganese tetraoxide according to claim 1, wherein the oxidation-reduction potential is at least 40 mV.

4. The process for producing the trimanganese tetraoxide according to claim 1, wherein the trimanganese tetraoxide is directly precipitated from the manganese aqueous solution.

5. The process according to claim 1, wherein the trimanganese tetraoxide has an average particle size of at least 1 μm.

6. The process according to claim 1, wherein the trimanganese tetraoxide has an average particle size of at most 20 μm.

7. The process according to claim 1, wherein the trimanganese tetraoxide has a relative standard deviation of the particle size of at most 35%.

8. A method for producing a lithium manganese oxide, comprising mixing the trimanganese tetraoxide as produced by the method of claim 1 with at least one of lithium and a lithium compound, and heating the mixture.

* * * * *